(12) United States Patent
Uttam et al.

(10) Patent No.: US 11,155,238 B2
(45) Date of Patent: Oct. 26, 2021

(54) SYSTEMS AND METHODS FOR DETERMINING DEVICE LOCATION FOR PASSIVE ENTRY AND VEHICLE STARTUP

(71) Applicant: GM GLOBAL TECHNOLOGY OPERATIONS LLC, Detroit, MI (US)

(72) Inventors: Rohit Uttam, Ann Arbor, MI (US); Thomas E. Utter, Royal Oak, MI (US); David T. Proefke, Troy, MI (US); Kenneth Strong, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 215 days.

(21) Appl. No.: 16/542,886

(22) Filed: Aug. 16, 2019

(65) Prior Publication Data

US 2021/0046899 A1 Feb. 18, 2021

(51) Int. Cl.
*B60R 25/20* (2013.01)
*B60R 25/04* (2013.01)
*G07C 9/00* (2020.01)
*H04W 4/021* (2018.01)

(52) U.S. Cl.
CPC ............ *B60R 25/209* (2013.01); *B60R 25/04* (2013.01); *G07C 9/00309* (2013.01); *H04W 4/021* (2013.01); *B60R 2025/0405* (2013.01); *B60R 2325/101* (2013.01); *B60R 2325/103* (2013.01); *B60R 2325/205* (2013.01); *G07C 2009/00547* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 8,427,276 B2 * | 4/2013 | McBride | B60R 25/245 340/5.64 |
| 9,807,570 B1 | 10/2017 | Lazarini et al. | |
| 9,894,492 B1 | 2/2018 | Elangovan et al. | |
| 9,894,613 B2 * | 2/2018 | Scheim | G07C 9/00309 |
| 2007/0024416 A1 * | 2/2007 | Tang | B60R 25/245 340/5.61 |
| 2017/0136992 A1 | 5/2017 | Hamada et al. | |
| 2017/0247016 A1 | 8/2017 | Krishnan | |
| 2018/0236972 A1 | 8/2018 | Linden et al. | |
| 2018/0316788 A1 | 11/2018 | Elliott | |
| 2018/0339676 A1 | 11/2018 | Lazarini et al. | |

OTHER PUBLICATIONS

U.S. Appl. No. 15/605,151, filed May 25, 2017, Marcelo Lazarini.

* cited by examiner

*Primary Examiner* — Carlos Garcia
(74) *Attorney, Agent, or Firm* — Harness, Dickey & Pierce, P.L.C.

(57) ABSTRACT

A transceiver is configured to: pair with a mobile device; and transmit a predetermined signal from an antenna to the mobile device. A zone module is configured to: receive a signal from the mobile device in response to the predetermined signal; and based on the signal, select a zone within which the mobile device is present from a group consisting of: a first zone that is defined by a first radius from the antenna; a second zone that excludes the first zone and that is defined by a second radius from the antenna, where the second radius is greater than the first radius; and a third zone that is radially outward of the second zone and that excludes the first and second zones.

23 Claims, 6 Drawing Sheets

SYSTEMS AND METHODS FOR DETERMINING DEVICE LOCATION FOR PASSIVE ENTRY AND VEHICLE STARTUP

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle entry and start systems and more particularly to passive entry and start systems using a mobile device.

Vehicles using remote keyless systems include a key fob, smartphone, or other device that may be used to actuate electronic locks to control access to or starting of a vehicle without using a traditional mechanical key. When the key fob, smartphone, or other device is near the vehicle, pressing a button on the key fob or smartphone, or touching a vehicle door either locks or unlocks the vehicle doors. When the key fob, smartphone or other device is in the vehicle, a vehicle can be started by pushing a button or other actuator.

SUMMARY

In a feature, a system of a vehicle includes: a transceiver configured to: pair with a mobile device; and transmit a predetermined signal from an antenna to the mobile device; a zone module configured to: receive a signal from the mobile device in response to the predetermined signal; and based on the signal, select a zone within which the mobile device is present from a group consisting of: a first zone that is defined by a first radius from the antenna; a second zone that excludes the first zone and that is defined by a second radius from the antenna, where the second radius is greater than the first radius; and a third zone that is radially outward of the second zone and that excludes the first and second zones; and at least one of: a latch control module configured to selectively actuate door latch actuators and enable opening of doors of the vehicle when the zone within which the mobile device is present is set to the second zone; and a start control module configured to selectively start the vehicle when the zone within which the mobile device is present is set to the first zone.

In further features: the first zone includes a first portion of a passenger cabin of the vehicle and does not include a second portion of a passenger cabin of the vehicle; and the second zone includes the second portion of the passenger cabin of the vehicle.

In further features, the antenna is located within a predetermined distance of a longitudinal axis of the vehicle.

In further features, the antenna is located on a longitudinal axis of the vehicle.

In further features, the system includes the latch control module and the latch control module is configured to actuate the door latch actuators and unlock the doors of the vehicle without user input to the vehicle when the zone within which the mobile device is present is set to the second zone.

In further features, the system includes the latch control module and the latch control module is configured to actuate the door latch actuators and unlock the doors of the vehicle in response to receipt of user input to unlock the doors of the vehicle when the zone within which the mobile device is present is set to the second zone.

In further features, the latch control module is configured to receive the user input to unlock the doors of the vehicle from a user input device located on exterior of the vehicle.

In further features, the zone module is configured to select the first zone as the zone within which the mobile device is present when the signal is greater than a first predetermined value.

In further features, the zone module is configured to select the second zone as the zone within which the mobile device is present when the signal is less than the first predetermined value and greater than a second predetermined value, where the second predetermined value is less than the first predetermined value.

In further features, the zone module is configured to select the third zone as the zone within which the mobile device is present when the signal is less than the second predetermined value.

In further features, the system includes both the latch control module and the start control module.

In further features, the system includes the start control module and the start control module is configured start the vehicle in response to receipt of user input to start the vehicle when the zone within which the mobile device is present is set to the first zone.

In further features, the system includes the latch control module and the latch control module is further configured to actuate the door latch actuators and lock the doors when: the zone within which the mobile device is present is set to the third zone; all of the doors of the vehicle are closed; at least one of the doors of the vehicle is unlocked; and a predetermined period has passed after the zone transitioned to the third zone.

In further features, the latch control module is configured to actuate the door latch actuators and lock the doors without receiving user input to lock the doors.

In further features, the system includes the latch control module and the latch control module is configured to, when the zone in which the mobile device is present is in the second zone after transitioning to the second zone from the first zone, not actuate the door latch actuators and unlock the doors in response to receipt of user input to unlock the doors from outside of the vehicle.

In further features, the system includes the latch control module and the latch control module is configured to, when the zone in which the mobile device is present is in the first zone and the doors are locked, not actuate the door latch actuators and unlock the doors in response to receipt of user input to unlock the doors from outside of the vehicle.

In further features, the system includes the latch control module and the latch control module is configured to, once at least one of the doors has been opened after the locking, actuate the door latch actuators and unlock the doors in response to receipt of user input to unlock the doors from outside of the vehicle.

In a feature, a method for a vehicle includes: by a transceiver: pairing with a mobile device; and transmitting a predetermined signal from an antenna to the mobile device; receiving a signal from the mobile device in response to the predetermined signal; based on the signal, selecting a zone within which the mobile device is present from a group consisting of: a first zone that is defined by a first radius from the antenna; a second zone that excludes the first zone and that is defined by a second radius from the antenna, where the second radius is greater than the first radius; and a third zone that is radially outward of the second zone and that excludes the first and second zones; and at least one of: selectively actuating door latch actuators and enable opening of doors of the vehicle when the zone within which the mobile device is present is set to the second zone; and selectively starting the vehicle when the zone within which the mobile device is present is set to the first zone.

In further features: the first zone includes a first portion of a passenger cabin of the vehicle and does not include a second portion of a passenger cabin of the vehicle; and the second zone includes the second portion of the passenger cabin of the vehicle.

In further features, at least one of: the antenna is located within a predetermined distance of a longitudinal axis of the vehicle; and the antenna is located on a longitudinal axis of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Passive entry and start systems include a Bluetooth low energy (BLE) module within a vehicle configured to pair with a mobile device. The BLE module transmits signals for determining signal strength to the mobile device via only one antenna.

The BLE module receives, for example, received signal strength indicator (RSSI) values from the mobile device based on the transmitted signals. The BLE module determines whether the mobile device is within a first zone, a second zone, or a third zone based on the RSSI value. The first zone may be defined by a first radius from the one antenna. The second zone is defined by a second radius (greater than the first radius) from the one antenna, but does not include the first zone. The third zone is outside of the second zone (e.g., everything outside of the second zone).

The first and second zones may be spherical in ideal environment conditions. The shape of the first and second zones, however, can be distorted in real environment conditions, for example, due to BLE signal reflections from various objects/matter surrounding the BLE module. A custom zone shaping can also be achieved by using one or more directional BLE antennas. The present application allows the detection of mobile device in the area surrounding the vehicle not limited by a specific height from the ground to which the mobile device is being held or carried, but is detectable in a predetermined height range from the ground.

When the mobile device is in the second zone, pressing an exterior button on the vehicle or on the mobile device locks or unlocks the vehicle or otherwise provides vehicle access. When the mobile device is in the second zone, pressing an exterior button on the vehicle or on the mobile device may (a) open or close or (b) lock or unlock a storage compartment of the vehicle, such as a rear hatch, a trunk, or a front storage compartment. Operation requests received from the mobile device may be executed in any connected range and not limited to the second zone. When the mobile device is within the first zone, the vehicle is started in response to a request to start the vehicle (e.g., from an interior actuator or button, a voice request, touchscreen input, etc.). In this way, the mobile device acts as an electronic key to unlock and start the vehicle.

By using only the 3 zones (the first zone, the second zone, and the third zone), the one antenna, and one BLE module, a cost of the passive entry and start system can be minimized.

Figure 1:
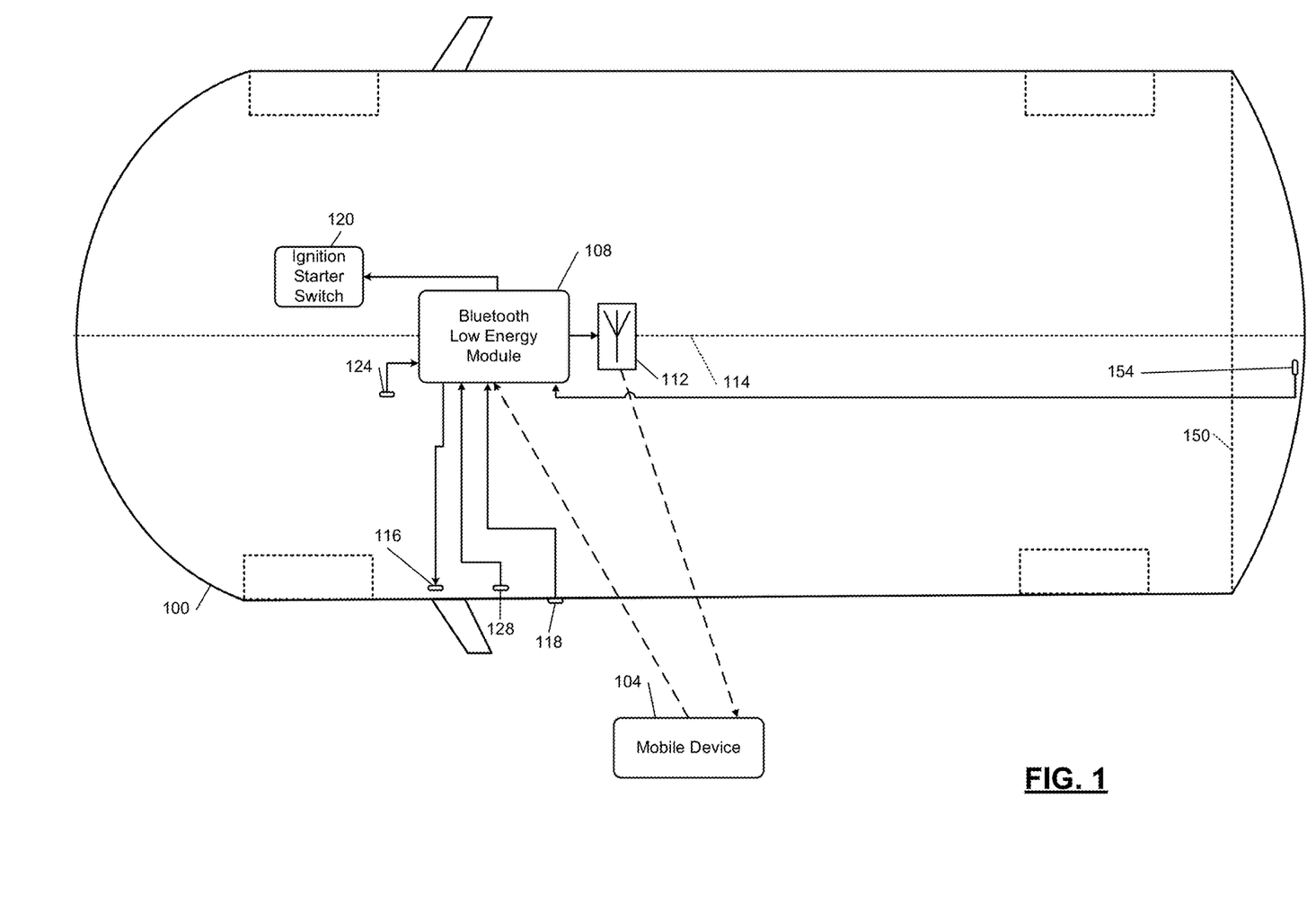
FIG. 1 is a functional block diagram of a passive entry and start system.

Referring to FIG. 1, a functional block diagram of a passive entry and start system is shown. Signals according to the Bluetooth Low Energy (BLE) protocol are generated at a predetermined radio frequency, such as 2.4 gigahertz (GHz) radio frequency or another frequency specified by the BLE protocol from the Bluetooth Special Interest Group (SIG) and defined in the BLUETOOTH wireless networking standard (including Core Specification versions 3.0, 4.0, 4.1, 4.2, 5.0, and 5.1 from the Bluetooth SIG).

A vehicle 100 connects with a mobile device 104 to allow passive locking and unlocking of door locks and access to storage compartments of the vehicle 100 and passive starting of the engine of the vehicle 100. The mobile device 104 may be a mobile phone, a tablet, or another type of wireless mobile electronic device that includes BLE connectivity.

The vehicle 100 includes a BLE module 108 and a BLE antenna 112. The BLE antenna 112 may be located within a predetermined distance of or on a longitudinal axis 114 of the vehicle, such as in a middle between front seats of the vehicle 100. For example only, the BLE antenna 112 may be located under cup holders located between the front seats of the vehicle 100. The predetermined distance may be, for example, 8 inches, 1 foot, or another suitable distance.

The BLE module 108 transmits data to the mobile device 104 for determination of a location of the mobile device 104 relative to the vehicle 100 through the BLE antenna 112. The BLE module 108 may be connected to the BLE antenna 112 via a twisted pair wire or a coaxial cable or co-located on the same circuit board. The BLE module 108 may also be connected via a vehicle communication bus, such as a controller area network (CAN) bus, a local interconnect network (LIN) bus, and/or one or more other suitable communication buses of the vehicle 100. The BLE module 108 may selectively wake up or shut down the vehicle communication bus, for example, to reduce power consumption.

While the vehicle 100 includes only the one BLE module 108 associated with passive entry and starting of the vehicle 100, additional BLE modules may be used by the vehicle 100 for other vehicle functions.

The mobile device 104 is paired with the vehicle 100 by a user using a traditional pairing process or an application installed on the mobile device 104. The pairing can be manual or automatic (e.g., when the mobile device 104 includes an application that performs automatic pairing).

Typically the manual pairing process includes triggering a pairing mode using vehicle and/or mobile device interfaces and selecting the vehicle 100 on the mobile device 104 interface (or vice versa). Some pairing processes may further require the use of a password or key to be entered into the vehicle 100 or the mobile device 104 or retrieved from a remote device, such as a server.

Once paired, the BLE module 108 is configured to selectively wirelessly transmit data to the mobile device 104 and receive data from the mobile device 104. During use, the BLE module 108 periodically advertises the availability of a connection. When the mobile device 104 is within a predetermined distance from the vehicle 100, a connection is established.

To identify a zone (or location and proximity) of the mobile device 104 relative to the vehicle 100, the BLE module 108 transmits a predetermined signal (e.g., having predetermined characteristics and/or magnitude) via the one BLE antenna 112 to the mobile device 104. The BLE module 108 receives a response from the mobile device 104 including an RSSI value. Alternatively, the BLE module 108 receives a response from the mobile device 104 and measures the signal strength to create the RSSI value. The BLE module 108 may also transmit with the predetermined signal, and receive from the mobile device 104 with the RSSI value, an identifier of the BLE antenna 112.

Based on the RSSI value, the BLE module 108 determines a zone in which the mobile device 104 is located. The RSSI value may increase as the distance between the BLE antenna 112 and the mobile device 104 decreases. Conversely, the RSSI value may decrease as the distance between the BLE antenna 112 and the mobile device 104 increases.

Figure 2:
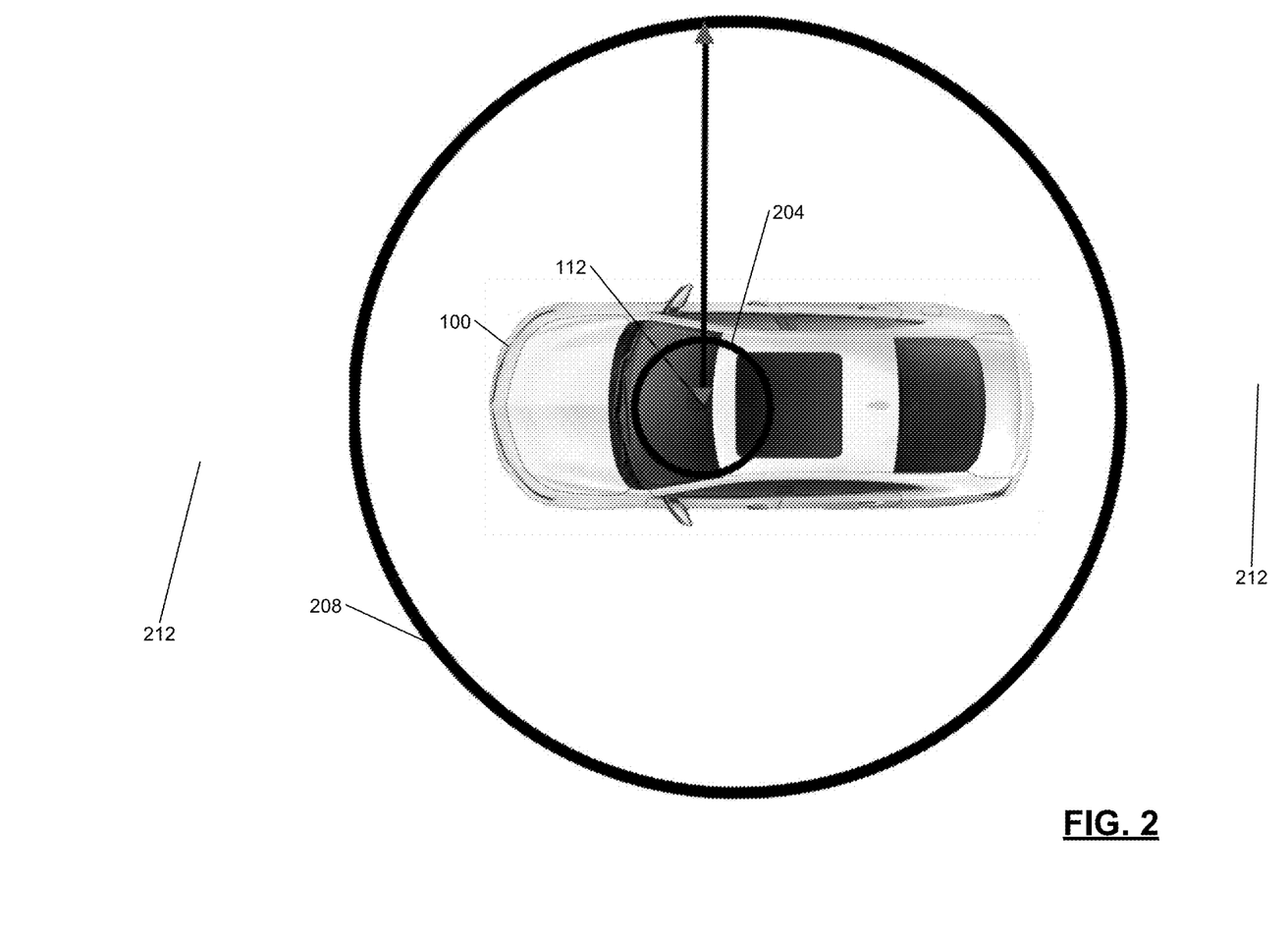
FIG. 2 is an example of zones around a vehicle.

FIG. 2 includes an example illustration of the zones. Different vehicle functions are enabled or disabled depending upon which zone the mobile device 104 is in. Because the vehicle 100 includes only the BLE module 108, the zones may be spherical but have different radiuses. The zones are mutually exclusive. The zones may be circular on a plane that is parallel to the ground. The zones may be cylindrical within a predetermined height range above the plane of the ground.

The BLE module 108 may determine that the mobile device 104 is in a first zone (zone 1) 204 when the RSSI value is greater than a first predetermined value. The first zone may be defined as to not extend outside of the vehicle 100 and be limited to within the vehicle 100. As shown, however, a portion of interior (passenger cabin) of the vehicle 100 (e.g., rear seats) may not be located within the first zone. The BLE module 108 may determine that the mobile device 104 is in a second zone (zone 2) 208 (and not in the first zone) when the RSSI value is less than the first predetermined value and greater than a second predetermined value. The second predetermined value is less than the first predetermined value. The BLE module 108 may determine that the mobile device 104 is in a third zone 212 (outside of the second zone 208) when the RSSI value is less than the second predetermined value.

The radius defining the second zone 208 may be, for example, less than or equal to 5 meters or another suitable distance. The radius defining the first zone 204 may be, for example, less than or equal to 2 meters or another suitable distance. In the present application, only 3 zones are defined. The use of only one BLE module may minimize cost without sacrificing security or convenience. The use of only one BLE module may also enable the use of only 3 zones. This is despite the first zone 204 not completely covering the interior of the vehicle 100 and the second zone 208 covering a portion of the interior of the vehicle 100 that is not covered by the first zone 204.

Certain vehicle functions are enabled and disabled based on the zone in which the mobile device 104 is located. For example, the BLE module 108 may enable starting of the ignition when the mobile device 104 is located within the first zone 204 and disabled when the mobile device 104 is in the second zone 208 or the third zone 212. Unlocking of the doors or cargo access may be enabled when the mobile device 104 is located in the second zone 208 and disabled when the mobile device 104 is in the first zone 204 or the third zone 212.

The mobile device 104 receives the predetermined signals from the BLE antenna 112, measures received signal strength (RSS) of the predetermined signal, and generates responses including an RSS indicator (RSSI) value for the predetermined signals. The mobile device 104 sends the responses to the BLE module 108.

While the example of the mobile device 104 determining the RSSI value and providing the RSSI value to the BLE module 108 is discussed, the BLE module 108 may instead determine the RSSI value based on a signal received from the mobile device 104. The present application is also applicable to the use of other types of indicators of a distance between the BLE module 104 and the mobile device 104, such as time-of-flight measurement, phase shift measurements, etc.

The BLE module 108 determines the (present) zone in which the mobile device 104 is located based on the RSSI values. Alternately, the mobile device 104 can determine the distance between the mobile device 104 and the BLE antenna 112 based on the RSSI and send the distance to the BLE module 108. The BLE module 108 can determine the zone in which the mobile device 104 is located based on the distance. For example, the BLE module 108 may determine that the mobile device 104 is in the first zone 204 when the distance is less than the predetermined radius of the first zone 204. The BLE module 108 may determine that the mobile device 104 is in the second zone 208 when the distance is greater than the predetermined radius of the first zone 204 and less than the predetermined radius of the second zone 208. The BLE module 108 may determine that the mobile device 104 is in the third zone when the distance is greater than the predetermined radius of the second zone 208. Alternately, the BLE module 108 can measure the RSS (relative signal strength) of the received signal from the mobile device 104 and determine the zone accordingly.

When the mobile device 104 is within the second zone 208, the vehicle 100 grants access to passive entry functions. For example, when the doors are locked, the BLE module 108 may actuate door latch actuators 116 and unlock the doors (or enable opening of the doors) when both (1) the user touches, comes in proximity to, or actuates one or more exterior input devices 118 on an exterior door of the vehicle 100 and (2) the mobile device 104 is within the second zone 208. In this way, the user does not need a traditional mechanical key or electronic key to unlock the vehicle 100 beyond that offered by the mobile device. The exterior input device 118 may be, for example, on one or more of the door handles of the vehicle 100. For example, one exterior button may be on the driver's side front door and/or on the passenger's side front door. In various implementations, the BLE module 108 may automatically unlock the doors (without user input via the exterior input device 118) when the mobile device 104 transitions from the third zone 212 to the second zone 208, as discussed further below.

When the doors of the vehicle 100 are unlocked, the BLE module 108 may actuate the door latch actuators 116 and lock the doors when both (1) the user touches, comes in proximity to, or actuates the button 120 and (2) the mobile device 104 is within the second zone 208. In various implementations, the BLE module 108 may actuate the door latch actuators 116 and lock the doors when the mobile device 104 transitions from the second zone 208 to the third zone 212, as discussed further below.

When the mobile device 104 is within the second zone 208, the vehicle 100 may also grant passive access to storage compartments or cargo areas. For example, the BLE module 108 may actuate or request actuation of a power rear closure 150 (FIG. 1) when both (1) the user touches, comes in proximity to, or actuates one or more exterior input devices 154 on an exterior of the vehicle 100 and (2) the mobile device 104 is within the second zone 208.

The BLE module 108 may also start the vehicle (e.g., the engine via closing an ignition starter switch 120) when the mobile device 104 is in the first zone 204. In various implementations, the BLE module 108 may start the vehicle when the mobile device 104 is in the first zone 204 and a request to start the vehicle is received, such as via the CAN, a voice request, or receipt of user input (e.g., user actuation of an interior button or switch, input to a touchscreen display to start the vehicle). Starting the vehicle includes activating the electrical and propulsion systems of the vehicle and allowing full operation of the vehicle. In this way, the user does not need to insert and actuate a traditional mechanical key nor carry an additional electronic key to start the engine once the mobile device 104 is in the first zone 204.

Figure 3:
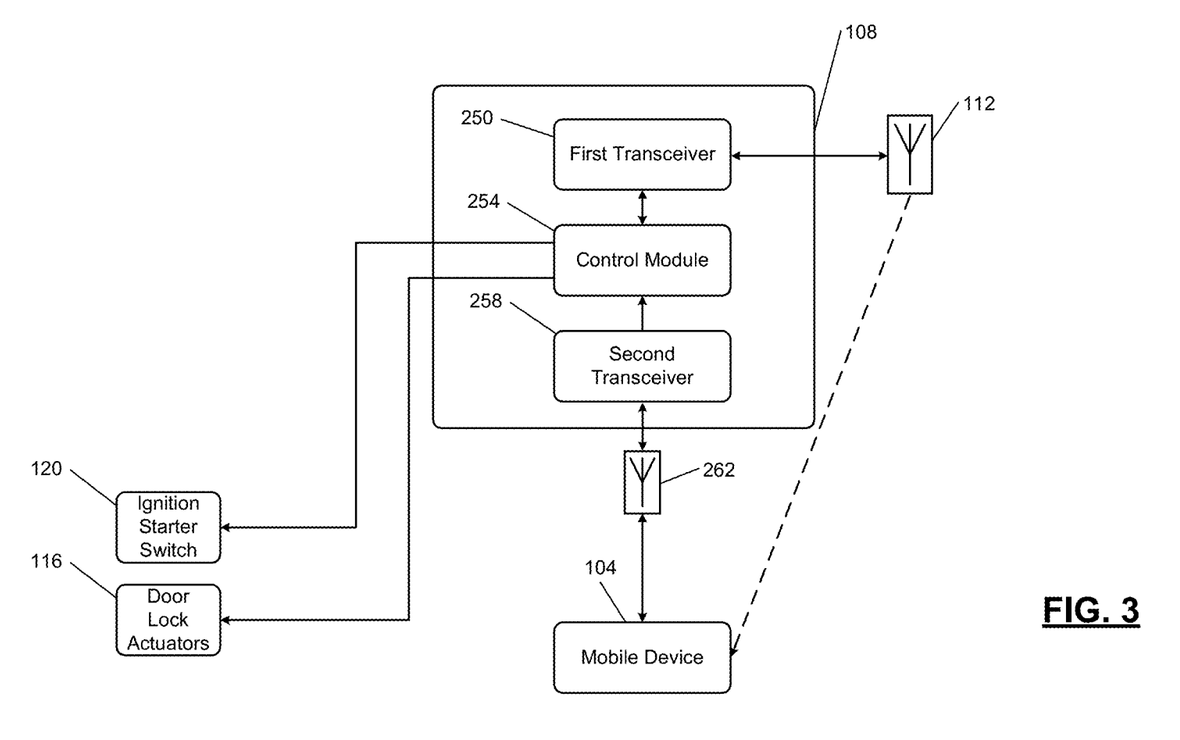
FIG. 3 is a functional block diagram including a Bluetooth Low Energy (BLE) module of a passive and start system.

Referring to FIG. 3, a functional block diagram of the BLE module 108 in the passive entry and start system is shown. The BLE module 108 includes a first transceiver 250, a control module 254, and a second transceiver 258. The first transceiver 250 and the second transceiver 258 may be Bluetooth transceivers or other transceivers configured to communicate via the BLE protocol.

The first transceiver 250 transmits the predetermined signals via the BLE antenna 112. The control module 254 may prompt the first transceiver 250 to transmit a predetermined signal via the BLE antenna at a predetermined rate, such as once per second or another suitable rate.

The mobile device 104 receives the predetermined signal and may determine an RSSI (value) each time a predetermined signal is received. For example, when the mobile device 104 receives the predetermined signal, the mobile device 104 may determine an RSSI based on the predetermined signal. The mobile device 104 may determine the RSSI, for example, using one of an equation and a lookup table that relates one or more characteristics (e.g., magnitude, power) of the predetermined signal to RSSI.

The mobile device 104 transmits the RSSIs to the BLE module 108 via a second antenna 262 or the BLE antenna 112. The control module 254 determines whether the mobile device 104 is in the first zone 204, the second zone 208, or the third zone 212 based on the RSSI. While the inclusion of the second transceiver 258 and the second antenna 262 is provided as an example, the second transceiver 258 and the second antenna 262 may be omitted. Transmission and reception to and from the mobile device 104 may be performed by the first transceiver 250 and the BLE antenna 112.

For example, the control module 254 determines that the mobile device 104 is in the first zone 204 when the RSSI is greater than the first predetermined value. The control module 254 determines that the mobile device 104 is in the second zone 208 when the RSSI is less than the first predetermined value and greater than the second predetermined value. The control module 254 determines that the mobile device is in the third zone 212 when the RSSI is greater than the second predetermined value.

When the mobile device 104 is within the second zone 208, the control module 254 allows access to the doors and cargo compartments of the vehicle. For example, the control module 254 may automatically (and without user input) actuate the door latch actuators 116 and unlock the doors of the vehicle 100 (or enable opening of the doors) when the mobile device 104 is within the second zone 208. In various implementations, the control module 254 may actuate the door latch actuators 116 and unlock the doors of the vehicle 100 in response to receipt of user input from the exterior input device 118 when the mobile device 104 is within the second zone 208.

When the mobile device 104 is within the first zone 204, the control module 254 actuates (closes) the ignition starter switch 120 in response to receipt of user input to an ignition input device 124 located within the first zone 204. When the ignition starter switch 120 is actuated, the starter motor engages the engine and applies power to the starter motor to drive rotation of the engine.

Figure 4:
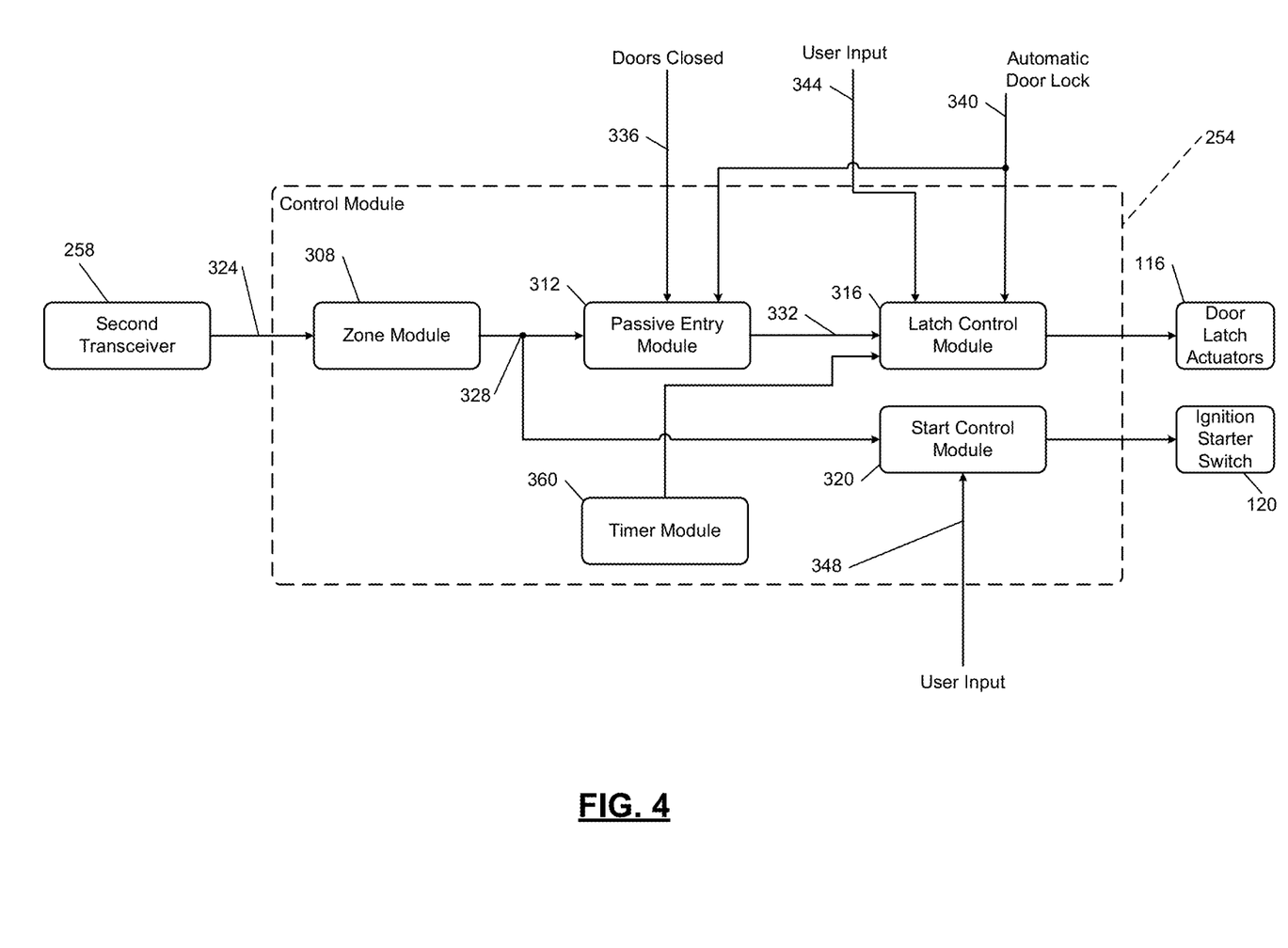
FIG. 4 is a functional block diagram of a control module of the BLE module.

Referring to FIG. 4, a functional block diagram of the control module 254 is shown. The control module 254 may include a zone module 308, a passive entry module 312, a latch control module 316, and a start control module 320. As discussed above, the mobile device 104 is paired with the vehicle 100 by the user using a traditional pairing process or an application on the mobile device 104. The pairing can be manual or automatic (when the mobile device 104 includes an application that performs automatic pairing).

Once paired, the zone module 308 receives, from the mobile device 104, the RSSIs values 324. The zone module 308 determines a zone 328 of the mobile device 104 based on the most recently received RSSI 324. For example, the zone module 308 sets the zone 328 to the first zone 204 when the RSSI 324 is greater than the first predetermined value (corresponding to the mobile device 104 being within the first predetermined radius of the first zone 204). The zone module 308 sets the zone 328 to the second zone 208 when the RSSI 324 is less than the first predetermined value and greater than the second predetermined value (corresponding to the mobile device 104 being outside of the first predetermined radius of the first zone 204 but within the second predetermined radius of the second zone 208). The zone module 308 sets the zone 328 to the third zone 212 when the RSSI 324 is less than the second predetermined value (corresponding to the mobile device 104 being outside of the second predetermined radius of the second zone 208).

The latch control module 316 selectively locks and unlocks all of the doors of the vehicle based on an automatic door lock signal 340 from a door lock input 128 located on an interior of the vehicle. The latch control module 316 selectively locks and unlocks the doors based on the automatic door lock signal 340 regardless of other inputs. For example, the latch control module 316 may lock the doors of the vehicle 100 in response to receipt of the automatic door lock signal 340 in a first state. The latch control module 316 may unlock all of the doors in response to the automatic door lock signal 340 in a second state.

The door lock input 128 may set the automatic door lock signal 340 to the first state in response to first user input to the door lock input 128. The door lock input 128 may set the automatic door lock signal 340 to the second state in response to second user input to the door lock input 128. The door lock input 128 may be, for example, located on a front door of the vehicle 100. In various implementations, one door lock input may be located on the interior of a front driver's side door, and one door lock input may be located on the interior of a front passenger's side door.

When a passive entry signal 332 is in a first state, the latch control module 316 controls locking and unlocking of the door latch actuators 116 based on user input 344, such as from the exterior input device 118, a key fob, or the mobile device 104. For example, when the doors are locked and the passive entry signal 332 is in the first state, the latch control module 316 may actuate the door latch actuators 116 to unlock one or more of the doors in response to receipt of the user input 344. When the doors of the vehicle are unlocked and the passive entry signal 332 is in the first state, the latch control module 316 may actuate the door latch actuators 116 to lock the doors in response to receipt of the user input 344.

When the passive entry signal 332 is in a second state, however, the latch control module 316 ignores the user input 344 from the exterior input device 118, thereby disabling passive entry into the vehicle 100. For example, when the doors of the vehicle are locked and the passive entry signal 332 is in the second state, the latch control module 316 does not actuate the door latch actuators 116 to unlock the doors in response to receipt of the user input 344. When the doors of the vehicle are unlocked and the passive entry signal 332 is in the second state, the latch control module 316 may not actuate the door latch actuators 116 to lock the doors in response to receipt of the user input 344.

The passive entry module 312 generates the passive entry signal 332 based on the zone 328 that the mobile device 104 is located in. For example, the passive entry module 312 sets the passive entry signal 332 to the first state (to enable passive entry into the vehicle 100) when the zone 328 is in the second zone 208. The passive entry module 312 sets the passive entry signal 332 to the second state (to disable passive entry into the vehicle 100) when the zone 328 is in the third zone 212.

The passive entry module 312 also sets the passive entry signal 332 to the second state (to disable passive entry into the vehicle 100) when the zone 328 is in the first zone 204. Disabling passive entry when the zone 328 is in the first zone 204 secures the vehicle 100 once the mobile device 104 is within the first zone 204.

The passive entry module 312 also sets the passive entry signal 332 to the second state (to disable passive entry into the vehicle 100) when the zone 328 is in the second zone 208 after the zone 328 transitions from the first zone 204 to the second zone 208 and all of the doors of the vehicle 100 are closed. This may occur, for example, if the mobile device 104 moves to the rear portion of the passenger cabin (e.g., a purse is moved to back seat, the mobile device 104 is given to back seat occupant, etc.). Disabling passive entry under these circumstances secures the vehicle 100.

A doors closed signal 336 indicates whether all of the doors are closed. For example, the doors closed signal 336 being in a first state may indicate that all of the doors of the vehicle 100 are closed. The doors closed signal 336 being in a second state may indicate that one or more of the doors of the vehicle 100 are open. Each door may include a switch that indicates whether that door is closed or open.

The passive entry module 312 may transition the passive entry signal 332 from the second state to the first state if one or more of the doors of the vehicle are opened while the zone 328 is in the second zone 208.

The passive entry module 312 also sets the passive entry signal 332 to the second state (to disable passive entry into the vehicle 100) when the doors are locked from inside the vehicle 100 (e.g., when the automatic door lock signal 340 is in the first state). Disabling passive entry under these circumstances secures the vehicle 100.

The start control module 320 selectively actuates (closes) the ignition starter switch 120 to start the engine of the vehicle 100 based on the location of the mobile device 104. More specifically, the start control module 320 selectively actuates (closes) the ignition starter switch 120 to start the engine of the vehicle 100 when both (i) the mobile device 104 is within the first zone 204 and (ii) user input 348 to start the vehicle has been received. The user input 348 may be received, for example, in response to user actuation or touching of an ignition button, switch, or other control located within the passenger cabin of the vehicle 100.

The latch control module 316 also automatically locks the door latch actuators 116 and locks the doors when a drive cycle is complete, one or more of the doors are unlocked, the zone 328 transitions from the second zone 208 to the third zone 212, and a predetermined period passes after the transitions from the second zone 208 to the third zone 212. A drive cycle may refer to the period between when the ignition system of the vehicle 100 is turned on and when the ignition system of the vehicle 100 is next turned off. The latch control module 316 may consider a drive cycle complete when the ignition system of the vehicle 100 is transitioned from on to off. The predetermined period may be calibratable and may be, for example, approximately 8 seconds or another suitable period.

The BLE module 108 therefore utilizes only the three zones described above. The BLE module 108 allows passive entry when the mobile device 104 is in the second zone 208. The BLE module 108 disables passive entry when the mobile device 104 is in the first zone 204. The BLE module 108 does not re-enable passive entry if the mobile device 104 transitions from the first zone 204 to the second zone 208 without at least one door of the vehicle opening. The BLE module 108 disables passive entry (via the exterior input device 118) when the doors are locked from within the vehicle, such as by the door lock input 128. The BLE module 108 re-enables passive entry only when one or more doors of the vehicle are opened. The BLE module 108 also automatically locks the doors of the vehicle when the mobile device 104 transitions from within the second zone 208 to the third zone 212 when a drive cycle is complete, at least one door is unlocked, and the predetermined period has passed.

The BLE module 108 also stores the zone 328 in which the mobile device 104 was last detected. For example, if the last detected zone was the first zone, the BLE module 108 keeps disabling passive entry if the connection of the mobile device 104 to the BLE module 108 is lost. The connection may be lost, for example, when a battery of the mobile device 104 has been depleted or when an intermittent disconnection of the mobile device 104 occurs.

Figure 5:
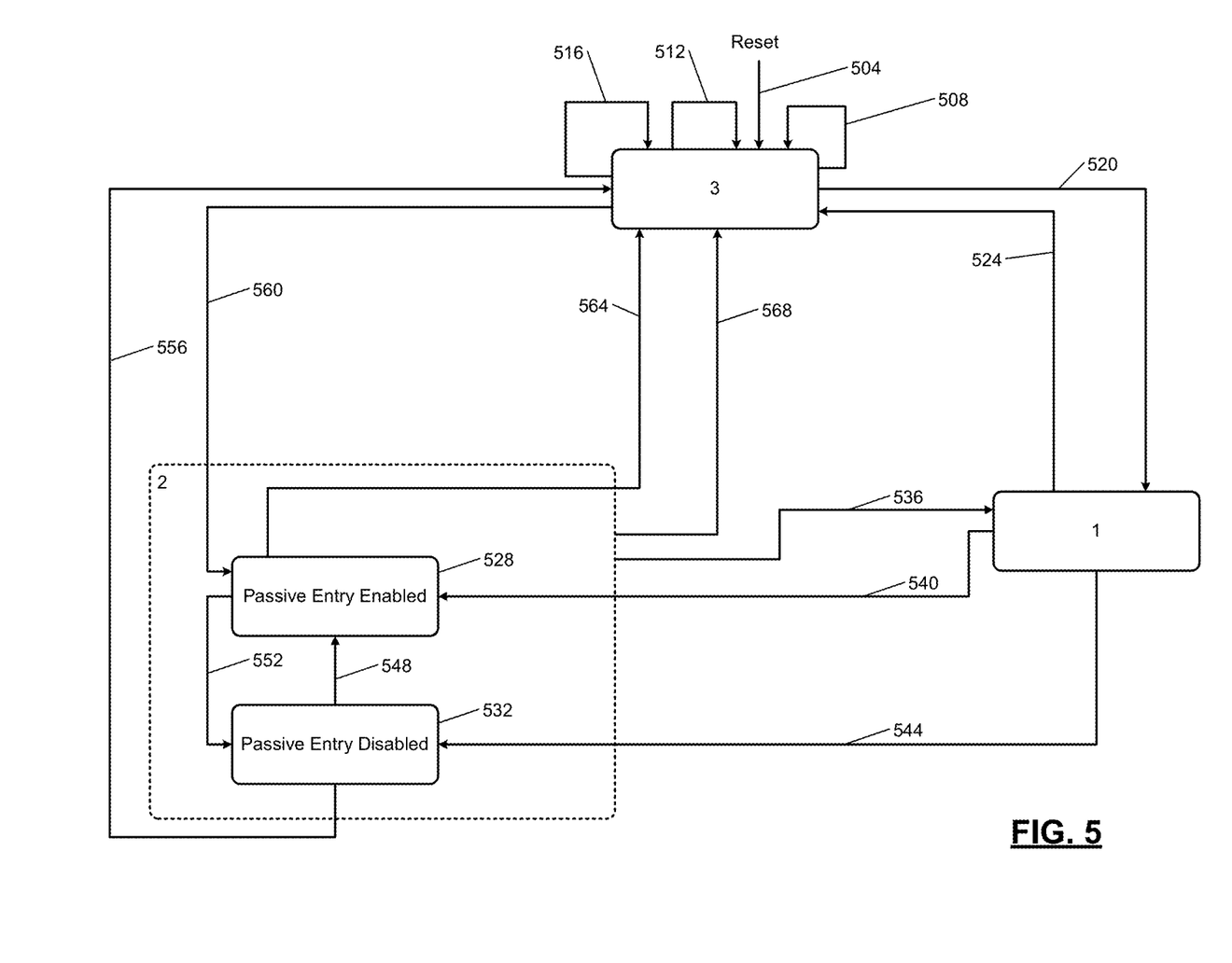
FIG. 5 is an example flow chart and state diagram regarding passive entry into a vehicle.

FIG. 5 is an example flow chart and state diagram regarding passive entry of the vehicle 100. The first zone 204 is represented by block 1 in FIG. 5. The second zone 208 is represented by block 2 in FIG. 5. The third zone 212 is represented by 3 in FIG. 5.

The zone module 308 sets the zone 328 to the third zone 212 after the vehicle 100 is reset (such as via disconnection from a battery of the vehicle 100) as illustrated by 504. As indicated by 508, when the zone 328 is set to the third zone 212, all of the doors of the vehicle 100 are closed, at least one of the doors of the vehicle 100 is unlocked, the latch control module 316 automatically actuates the door latch actuators 116 (without receiving user input to lock the doors) and locks the doors when the predetermined period has passed after the zone 328 transitioned from the second zone 208 to the third zone 212. For example, a timer module 360 may initialize a count-down timer to the predetermined period and start the count-down timer (counting down) when the zone 328 transitions from the second zone 208 to the third zone 212, all of the doors are closed, and at least one of the doors are locked. The latch control module 316 may automatically actuate the door latch actuators 116 when the count-down timer reaches zero. In a further embodiment, the vehicle operator may choose to enable or disable the automatic locking operation via a customer interface on the mobile device, in the vehicle, or through another interface with communication connectivity to the vehicle.

As illustrated by 512, the timer module 360 may stop (pause) the count-down timer if all of the doors are locked, such as in response to receipt of user input, and the zone 328 is in the third zone 212. As illustrated by 516, the timer module 360 may reset the count-down timer to the predetermined period if one or more of the doors are open and the zone 328 is in the third zone 212.

520 illustrates the zone 328 transitioning from the third zone 212 to the first zone 204, and the passive entry module 312 disabling passive entry (setting the passive entry signal 332 to the second state) when the zone 328 is in the first zone 204. The timer module 360 may also cancel (e.g., reset and pause) the count-down timer at 520. 524 illustrates the zone 328 transitioning from the first zone 204 to the third zone 212.

528 illustrates passive entry into the vehicle 100 being enabled. 532 illustrates passive entry into the vehicle 100 being disabled. 536 illustrates the zone 328 transitioning from the second zone 208 to the first zone 204, and the passive entry module 312 disabling passive entry (setting the passive entry signal 332 to the second state) when the zone 328 is in the first zone 204. 540 illustrates the passive entry module 312 enabling passive entry (setting the passive entry signal 332 to the first state) when at least one door is open and the zone 328 transitioned from the first zone 204 to the second zone 208. 544 illustrates the passive entry module 312 disabling passive entry (setting the passive entry signal 332 to the second state) when all of the doors are closed and the zone 328 transitioned from the first zone 204 to the second zone 208.

548 illustrates the passive entry module 312 enabling passive entry (transitioning the passive entry signal 332 from the second state to the first state) when the zone 328 is in the second zone 208 and at least one door is opened. 552 illustrates the passive entry module 312 disabling passive entry (transitioning the passive entry signal 332 from the first state to the second state) when the zone 328 is in the second zone 208 and the doors are locked from inside the vehicle 100 (e.g., when the automatic door lock signal 340 is in the first state).

556 illustrates the zone 328 transitioning from the second zone 208 to the third zone 212. 560 illustrates the passive entry module 312 enabling passive entry (setting the passive entry signal 332 to the first state) when the zone 328 transitions from the third zone 212 to the second zone 208. The timer module 360 may also cancel (e.g., reset and pause) the count-down timer at 560.

564 illustrates the passive entry module 312 disabling passive entry (transitioning the passive entry signal 332 from the first state to the second state) when the zone 328 transitions from the second zone 208 to the third zone 212, at least one of the doors is open, and all of the doors are locked. 568 illustrates the passive entry module 312 disabling passive entry (transitioning the passive entry signal 332 from the first state to the second state) when the zone 328 transitions from the second zone 208 to the third zone 212, all of the doors are closed, a drive cycle is complete, and at least one of the doors is unlocked. The timer module 360 may also reset the count-down timer to the predetermined period at 568.

Figure 6:
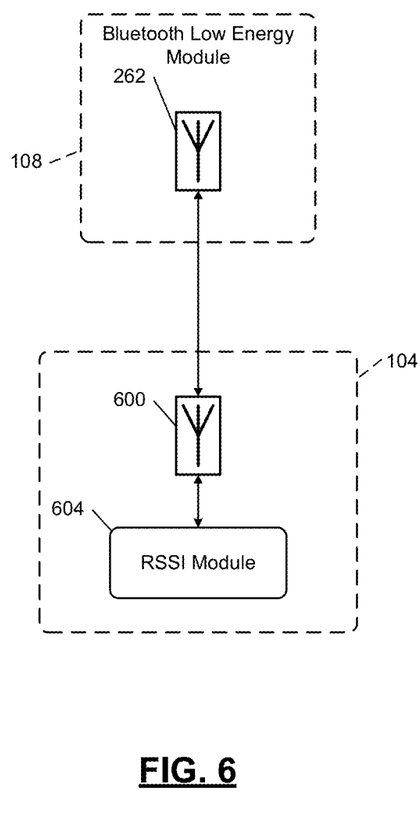
FIG. 6 is a functional block diagram of a mobile device used to grant a user access to vehicle functions.

FIG. 6 includes a functional block diagram of the mobile device 104. The mobile device 104 includes one or more antennas, such as device antenna 600, and a RSSI module 604. For each predetermined signal received, the RSSI module 604 determines the RSSI based on characteristics of the predetermined signal. For example, the RSSI module 604 may determine the RSSI using one or more equations and/or lookup tables that relate characteristics of the predetermined signal to RSSI.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG). The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system of a vehicle, comprising:
a transceiver configured to:
  pair with a mobile device; and
  transmit a predetermined signal from an antenna to the mobile device;
a zone module configured to:
  receive a signal from the mobile device in response to the predetermined signal; and
  based on the signal, select a zone within which the mobile device is present from a group consisting of:
    a first zone that is defined by a first radius from the antenna;
    a second zone that excludes the first zone and that is defined by a second radius from the antenna, wherein the second radius is greater than the first radius; and
    a third zone that is radially outward of the second zone and that excludes the first and second zones; and
at least one of:
  a latch control module configured to selectively actuate door latch actuators and enable opening of doors of the vehicle when the zone within which the mobile device is present is set to the second zone; and
  a start control module configured to selectively start the vehicle when the zone within which the mobile device is present is set to the first zone;
wherein:
  the first zone includes a first portion of a passenger cabin of the vehicle and does not include a second portion of a passenger cabin of the vehicle; and the second zone includes the second portion of the passenger cabin of the vehicle.

2. The system of claim 1 wherein the antenna is located within a predetermined distance of a longitudinal axis of the vehicle.

3. The system of claim 1 wherein the antenna is located on a longitudinal axis of the vehicle.

4. The system of claim 1 wherein the system includes the latch control module and the latch control module is configured to actuate the door latch actuators and unlock the doors of the vehicle without user input to the vehicle when the zone within which the mobile device is present is set to the second zone.

5. The system of claim 1 wherein the system includes both the latch control module and the start control module.

6. The system of claim 1 wherein the system includes the start control module and the start control module is configured start the vehicle in response to receipt of user input to start the vehicle when the zone within which the mobile device is present is set to the first zone.

7. The system of claim 1 wherein the system includes the latch control module and the latch control module is configured to, when the zone in which the mobile device is present is in the second zone after transitioning to the second zone from the first zone, not actuate the door latch actuators and unlock the doors in response to receipt of user input to unlock the doors from outside of the vehicle.

8. The system of claim 1 wherein the system includes the latch control module and the latch control module is configured to actuate the door latch actuators and unlock the doors of the vehicle in response to receipt of user input to unlock the doors of the vehicle when the zone within which the mobile device is present is set to the second zone.

9. The system of claim 8 wherein the latch control module is configured to receive the user input to unlock the doors of the vehicle from a user input device located on exterior of the vehicle.

10. The system of claim 1 wherein the system includes the latch control module and the latch control module is further configured to actuate the door latch actuators and lock the doors when:
the zone within which the mobile device is present is set to the third zone;
all of the doors of the vehicle are closed;
at least one of the doors of the vehicle is unlocked; and
a predetermined period has passed after the zone transitioned to the third zone.

11. The system of claim 10 wherein the latch control module is configured to actuate the door latch actuators and lock the doors without receiving user input to lock the doors.

12. The system of claim 1 wherein the system includes the latch control module and the latch control module is configured to, when the zone in which the mobile device is present is in the first zone and the doors are locked, not actuate the door latch actuators and unlock the doors in response to receipt of user input to unlock the doors from outside of the vehicle.

13. The system of claim 12 wherein the system includes the latch control module and the latch control module is configured to, once at least one of the doors has been opened after the locking, actuate the door latch actuators and unlock the doors in response to receipt of user input to unlock the doors from outside of the vehicle.

14. The system of claim 1 wherein the zone module is configured to select the first zone as the zone within which the mobile device is present when the signal is greater than a first predetermined value.

15. The system of claim 14 wherein the zone module is configured to select the second zone as the zone within which the mobile device is present when the signal is less than the first predetermined value and greater than a second predetermined value,
wherein the second predetermined value is less than the first predetermined value.

16. The system of claim 15 wherein the zone module is configured to select the third zone as the zone within which the mobile device is present when the signal is less than the second predetermined value.

17. A method for a vehicle, comprising:
by a transceiver:
pairing with a mobile device; and
transmitting a predetermined signal from an antenna to the mobile device;
receiving a signal from the mobile device in response to the predetermined signal;
based on the signal, selecting a zone within which the mobile device is present from a group consisting of:
a first zone that is defined by a first radius from the antenna;
a second zone that excludes the first zone and that is defined by a second radius from the antenna, wherein the second radius is greater than the first radius; and
a third zone that is radially outward of the second zone and that excludes the first and second zones; and
at least one of:
selectively actuating door latch actuators and enable opening of doors of the vehicle when the zone within which the mobile device is present is set to the second zone; and
selectively starting the vehicle when the zone within which the mobile device is present is set to the first zone;
wherein:
the first zone includes a first portion of a passenger cabin of the vehicle and does not include a second portion of a passenger cabin of the vehicle; and
the second zone includes the second portion of the passenger cabin of the vehicle.

18. The method of claim 17 wherein one of:
the antenna is located within a predetermined distance of a longitudinal axis of the vehicle; and
the antenna is located on the longitudinal axis of the vehicle.

19. A system of a vehicle, comprising:
a transceiver configured to:
pair with a mobile device; and
transmit a predetermined signal from an antenna to the mobile device;
a zone module configured to:
receive a signal from the mobile device in response to the predetermined signal; and
based on the signal, select a zone within which the mobile device is present from a group consisting of:
a first zone that is defined by a first radius from the antenna;
a second zone that excludes the first zone and that is defined by a second radius from the antenna, wherein the second radius is greater than the first radius; and
a third zone that is radially outward of the second zone and that excludes the first and second zones; and
at least one of:

a latch control module configured to selectively actuate door latch actuators and enable opening of doors of the vehicle when the zone within which the mobile device is present is set to the second zone; and
a start control module configured to selectively start the vehicle when the zone within which the mobile device is present is set to the first zone,
wherein the system includes the latch control module and the latch control module is configured to actuate the door latch actuators and unlock the doors of the vehicle in response to receipt of user input to unlock the doors of the vehicle when the zone within which the mobile device is present is set to the second zone.

20. A system of a vehicle, comprising:
a transceiver configured to:
  pair with a mobile device; and
  transmit a predetermined signal from an antenna to the mobile device;
a zone module configured to:
  receive a signal from the mobile device in response to the predetermined signal; and
  based on the signal, select a zone within which the mobile device is present from a group consisting of:
    a first zone that is defined by a first radius from the antenna;
    a second zone that excludes the first zone and that is defined by a second radius from the antenna, wherein the second radius is greater than the first radius; and
    a third zone that is radially outward of the second zone and that excludes the first and second zones; and
at least one of:
  a latch control module configured to selectively actuate door latch actuators and enable opening of doors of the vehicle when the zone within which the mobile device is present is set to the second zone; and
  a start control module configured to selectively start the vehicle when the zone within which the mobile device is present is set to the first zone,
wherein the system includes the start control module and the start control module is configured start the vehicle in response to receipt of user input to start the vehicle when the zone within which the mobile device is present is set to the first zone.

21. A system of a vehicle, comprising:
a transceiver configured to:
  pair with a mobile device; and
  transmit a predetermined signal from an antenna to the mobile device;
a zone module configured to:
  receive a signal from the mobile device in response to the predetermined signal; and
  based on the signal, select a zone within which the mobile device is present from a group consisting of:
    a first zone that is defined by a first radius from the antenna;
    a second zone that excludes the first zone and that is defined by a second radius from the antenna, wherein the second radius is greater than the first radius; and
    a third zone that is radially outward of the second zone and that excludes the first and second zones; and
at least one of:
  a latch control module configured to selectively actuate door latch actuators and enable opening of doors of the vehicle when the zone within which the mobile device is present is set to the second zone; and
  a start control module configured to selectively start the vehicle when the zone within which the mobile device is present is set to the first zone,
wherein the system includes the latch control module and the latch control module is further configured to actuate the door latch actuators and lock the doors when:
  the zone within which the mobile device is present is set to the third zone;
  all of the doors of the vehicle are closed;
  at least one of the doors of the vehicle is unlocked; and
  a predetermined period has passed after the zone transitioned to the third zone.

22. A system of a vehicle, comprising:
a transceiver configured to:
  pair with a mobile device; and
  transmit a predetermined signal from an antenna to the mobile device;
a zone module configured to:
  receive a signal from the mobile device in response to the predetermined signal; and
  based on the signal, select a zone within which the mobile device is present from a group consisting of:
    a first zone that is defined by a first radius from the antenna;
    a second zone that excludes the first zone and that is defined by a second radius from the antenna, wherein the second radius is greater than the first radius; and
    a third zone that is radially outward of the second zone and that excludes the first and second zones; and
at least one of:
  a latch control module configured to selectively actuate door latch actuators and enable opening of doors of the vehicle when the zone within which the mobile device is present is set to the second zone; and
  a start control module configured to selectively start the vehicle when the zone within which the mobile device is present is set to the first zone,
wherein the system includes the latch control module and the latch control module is configured to, when the zone in which the mobile device is present is in the second zone after transitioning to the second zone from the first zone, not actuate the door latch actuators and unlock the doors in response to receipt of user input to unlock the doors from outside of the vehicle.

23. A system of a vehicle, comprising:
a transceiver configured to:
  pair with a mobile device; and
  transmit a predetermined signal from an antenna to the mobile device;
a zone module configured to:
  receive a signal from the mobile device in response to the predetermined signal; and
  based on the signal, select a zone within which the mobile device is present from a group consisting of:
    a first zone that is defined by a first radius from the antenna;
    a second zone that excludes the first zone and that is defined by a second radius from the antenna, wherein the second radius is greater than the first radius; and
    a third zone that is radially outward of the second zone and that excludes the first and second zones; and at least one of:
- a latch control module configured to selectively actuate door latch actuators and enable opening of doors of the vehicle when the zone within which the mobile device is present is set to the second zone; and
- a start control module configured to selectively start the vehicle when the zone within which the mobile device is present is set to the first zone, wherein the system includes the latch control module and the latch control module is configured to, when the zone in which the mobile device is present is in the first zone and the doors are locked, not actuate the door latch actuators and unlock the doors in response to receipt of user input to unlock the doors from outside of the vehicle.

* * * * *